UNITED STATES PATENT OFFICE.

EDWARD MILTON BURT, OF PARIS, ILLINOIS.

SOLUTION FOR GALVANIC BATTERIES.

SPECIFICATION forming part of Letters Patent No. 428,888, dated May 27, 1890.

Application filed March 10, 1890. Serial No. 343,390. (No specimens.)

*To all whom it may concern:*

Be it known that I, EDWARD MILTON BURT, of Paris, in the county of Edgar and State of Illinois, have invented new and useful Improvements in Galvanic Batteries, of which the following is a full, clear, and exact description.

The object of my invention is to provide an inexpensive and effective exciting solution for galvanic batteries.

My invention consists in a solution formed by dissolving the salts produced by the burning of cobs of Indian corn.

In carrying out my invention I arrange plates of zinc and carbon in alternation and suspend them in a suitable vessel, and I prepare the exciting solution from the cobs of Indian corn by burning them and taking the ash so produced and mixing it with a suitable quantity of water, allowing it to stand until the soluble matter is removed from the ash, when it is ready to receive the zinc and carbon elements of the battery. After standing a few days in the solution the battery thus prepared becomes active, and may be used for a number of weeks before requiring a renewal of the solution.

The battery is adapted to open and closed circuit work, and delivers a current having an electro-motive force of about one volt. As the battery requires no porous cell or diaphragm, and as the zinc and carbon plates are preferably arranged near each other, the battery is excited by this solution, has a very low resistance, and is therefore able to deliver a large current.

The principal salt dissolved from the ashes of the corn-cob is carbonate of potash. This salt contributes mainly to the action of the battery, but the other soluble ingredients also add to its efficiency.

An analysis of the ash of the corn-cob shows the exciting-salts used in my battery to be composed of carbonate, phosphate, silicate, and chloride of sodium, potassium, iron, calcium, and magnesium.

Having thus described my invention, I claim as new and desire to secure by Letters Patent—

1. In a galvanic battery, an exciting solution formed of the soluble salts of burned Indian-corn cobs, the same consisting of carbonate, phosphate, silicate, and chloride of sodium, potassium, iron, calcium, and magnesium, as specified.

2. In a galvanic battery, an exciting solution formed of carbonate of potash and other soluble salts derived from the ash of the Indian-corn cob, as specified.

EDWARD MILTON BURT.

Witnesses:
 M. M. BURT, Jr.,
 FRANK F. HAGER.